US 9,855,955 B2

(12) United States Patent
Rios, III et al.

(10) Patent No.: US 9,855,955 B2
(45) Date of Patent: Jan. 2, 2018

(54) METHODS AND APPARATUSES TO OPERATE A VEHICLE

(71) Applicant: AT&T Intellectual Property I, L.P., Atlanta, GA (US)

(72) Inventors: Roque Rios, III, Middletown, NJ (US); Luis Ramos, Columbia, CT (US); James Gordon Beattie, Jr., Bergenfield, NJ (US); Stephen Francis Triano, Hillsborough, NJ (US); Amee Fontanetta, Cliffwood Beach, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 21 days.

(21) Appl. No.: 15/014,840

(22) Filed: Feb. 3, 2016

(65) Prior Publication Data

US 2017/0217442 A1 Aug. 3, 2017

(51) Int. Cl.
*G06F 7/00* (2006.01)
*B60W 50/00* (2006.01)
*B60W 30/06* (2006.01)
*B60R 16/037* (2006.01)

(52) U.S. Cl.
CPC ........... *B60W 50/00* (2013.01); *B60R 16/037* (2013.01); *B60W 30/06* (2013.01); *B60W 2050/0089* (2013.01)

(58) Field of Classification Search
CPC ............... B60W 50/00; B60W 30/06; B60W 2050/0089; B60R 16/037
USPC .................... 701/36, 300, 533; 340/903, 988
See application file for complete search history.

(56) References Cited

U.S. PATENT DOCUMENTS

2012/0323474 A1* 12/2012 Breed .................. B60W 30/04
701/117

* cited by examiner

*Primary Examiner* — Gertrude Arthur Jeanglaude
(74) *Attorney, Agent, or Firm* — Hanley, Flight & Zimmerman, LLC

(57) ABSTRACT

Methods, apparatus, systems and articles of manufacture are disclosed for operating a vehicle. The vehicle is operated by tracking a location of the vehicle, a vehicle configuration and external conditions around the vehicle over a time period. A repetitive occurrence is identified, the repetitive occurrence having a start condition and an end condition and a transition path between the start position and the end condition. The number of times the repetitive occurrence occurs during the time period is determined and compared to a first threshold. When the first threshold is satisfied and the vehicle is located at the start condition, a function is provided, that when activated by an operator of the vehicle, will automatically transition the vehicle along the transition path between the start position and the end condition.

20 Claims, 7 Drawing Sheets

METHODS AND APPARATUSES TO OPERATE A VEHICLE

FIELD OF THE DISCLOSURE

This disclosure relates generally to automotive control systems and, more particularly, to methods and apparatuses to operate a vehicle.

BACKGROUND

Modern vehicles are equipped with positioning systems to locate and track vehicle position. For example, the positioning system may include a global positioning system, an inertial positioning system, a positioning system that uses multiple wireless signals to determine position (via cell towers, and/or WiFi access points), or a combination of these types of systems.

In addition, vehicles may be equipped with sensors that allow the vehicle to detect and track the internal and the external conditions of the vehicle. The sensors may also determine and track the operating parameters of the vehicle.

BRIEF DESCRIPTION OF THE DRAWINGS

The figures are not to scale. The same reference numbers will be used throughout the drawing(s) and accompanying written description to refer to the same or like parts.

DETAILED DESCRIPTION

Figure 1:
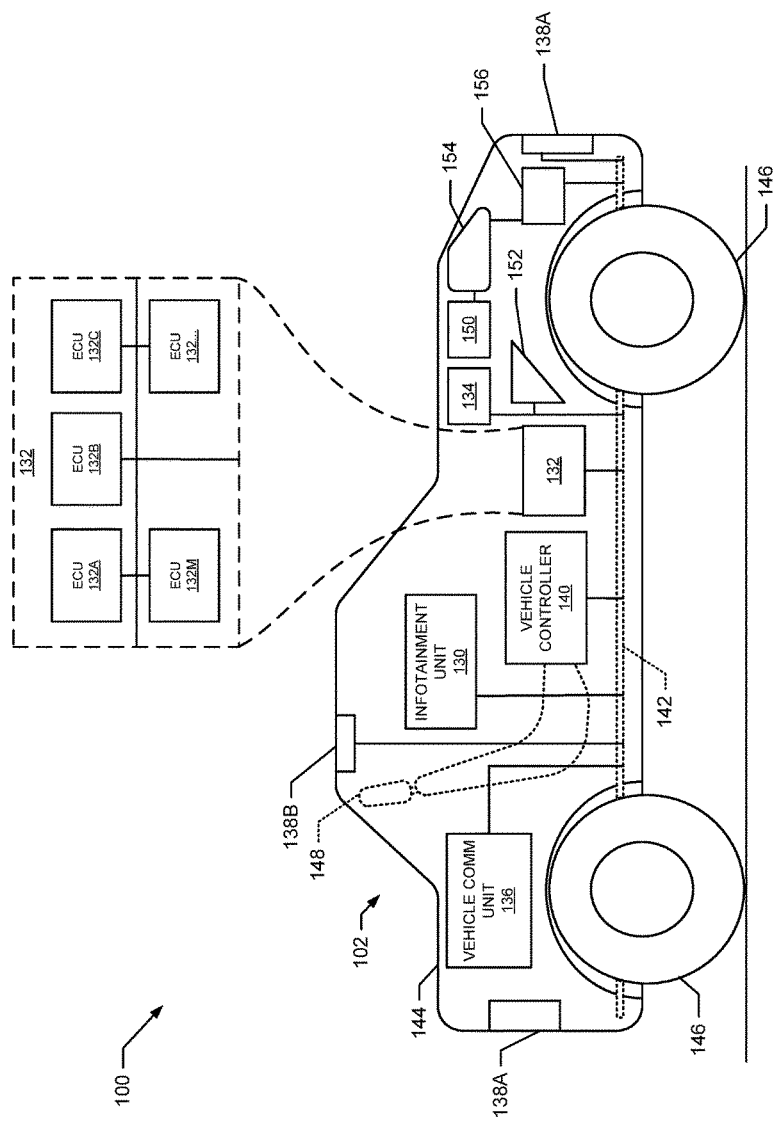
FIG. 1 illustrates an example system constructed in accordance with an embodiment of this disclosure to operate a vehicle.

Example methods disclosed herein include operating a vehicle by identifying a repetitive occurrence during a floating time window. The repetitive occurrence is based on a starting vehicle condition and a transition path between the starting condition and an ending condition. Once a repetitive occurrence has been identified, the example method includes detecting the occurrence of the starting vehicle condition. When the starting vehicle condition occurs, the vehicle provides a function that, when activated, automatically transitions the vehicle to the ending vehicle condition along the transition path.

An example tangible article of manufacture comprising instructions is disclosed herein. The example instructions operate a vehicle by identifying a repetitive occurrence during a floating time window. The repetitive occurrence is based on a starting vehicle condition, an ending vehicle condition and a transition path between the starting condition and ending condition. Once a repetitive occurrence has been identified, the example method includes detecting the occurrence of the starting vehicle condition. When the starting vehicle condition occurs, the vehicle provides a function that, when activated, automatically transitions the vehicle to the ending vehicle condition along the transition path.

An example apparatus is disclosed herein. The example apparatus includes a vehicle with a position tracking system and a set of sensors. The position tracking system tracks the location of the vehicle over time. The sensors detect and track the internal and the external conditions of the vehicle and determine and track the vehicle configuration of the vehicle. The example apparatus includes a vehicle controller that includes a repetitive occurrence detector, a starting condition detector, a transition path detector, and an automatic transition provider. The example vehicle controller includes a repetitive occurrence detector to detect repetitive occurrences during a floating time window based on a starting vehicle condition, an ending vehicle condition and a transition path between the starting condition and ending condition. The example vehicle controller includes a starting condition detector to detect the starting condition of a repetitive occurrence. The example vehicle controller includes a transition detector to detect a transition path between the starting condition and an ending condition. The example vehicle controller includes an automatic transition provider to allow a user to enable the vehicle to automatically transition the vehicle from the starting condition to the ending condition along the transition path.

The repetitive occurrence can be identified when a starting vehicle condition, an ending vehicle condition and a transition path between the starting condition and ending condition occur more than a threshold amount of times within a given floating time window.

The starting vehicle condition may be based on a vehicle location or position, a vehicle velocity or acceleration rate, the environmental conditions in or around the vehicle, the vehicle configuration of the vehicle, and the like, or a combination of the above starting conditions.

The ending vehicle condition may be based on a vehicle location or position, a vehicle velocity or acceleration rate, the environmental conditions in or around the vehicle, the vehicle configuration of the vehicle, and the like, or a combination of the above ending conditions.

The transition path between the starting condition and ending condition may be based on a path the vehicle follows from a starting location to an ending location, a velocity/acceleration profile between a starting location and an ending location, a velocity/acceleration profile between a starting velocity and an ending velocity, a vehicle configuration between a starting velocity and an ending velocity, a vehicle configuration between a starting position and an ending position, a vehicle configuration between a starting environmental condition and an ending environmental condition, and the like, or a combination of the above transition paths.

The environmental conditions in the vehicle may include the temperature, the number and/or the identity of occupants, the type of media being presented, the time of day and/or day of the week, and the like, or a combination of the above.

The environmental conditions around the vehicle may include the temperature, the surface road condition (e.g., dry, wet, snow covered, icy, etc.), the weather conditions (dry, raining, snowing, foggy, etc.), the number and proximity of objects (e.g., light traffic, heavy traffic, pedestrians present, narrow road, wide road/open space, etc.), the presence or absence of certain items or objects (e.g., sensors), the velocity of objects nearby the vehicle (stationary, slow or fast, moving away from, or toward, the vehicle), and the like, or a combination of the above.

The vehicle configuration may include the type of media being presented (e.g., fast or slow tempo music, movie being presented, sports reports, weather reports, etc.), the environmental settings (e.g., air conditioner/heater on or off, windows open or closed), the vehicle subsystems operating (e.g., headlights on or off, wipers on or off, traction control on or off, 4 wheel drive engaged or disengaged, etc.), performance parameters (e.g., engine RPMs, vehicle speed, fuel level, engine temperature, etc.), and the like, or a combination of the above.

In one example embodiment, the repetitive occurrence is backing the car out of a garage or parking place. The repetitive occurrence includes a starting location and an ending location. The starting location may include environmental conditions around the vehicle. For example, the vehicle may detect an enclosed space, for example a front wall, a roof, and/or two side walls at the starting location. The starting position may include a vehicle configuration. For example, the vehicle is stopped (zero velocity) and in park at the starting position. The transition path includes placing the vehicle in reverse and moving the vehicle in a reverse direction from the starting position to the ending position. The transition path may also include changing from a reverse gear into a forward gear. It will be appreciated that many other repetitive occurrences are possible, including parking a car into a garage or parking place.

The term "automatic" and variations thereof, as used herein, refers to any process or operation done without material human input when the process or operation is performed. Human input is deemed to be material if such input influences how the process or operation will be performed. Human input that consents to the performance of the process or operation is not deemed to be material.

The term "vehicle" and variations thereof, as used herein, refers to a means of transportation designed for operation on ordinary roads (paved or un-paved) and typically having four wheels, a steering mechanism and a motor or engine to provide motive power. Some example vehicles include cars, trucks, motorcycles, sports utility vehicle (SUV), jeeps, semi-trailer trucks (also known as semi-trucks) and the like.

FIG. 1 illustrates an example system 100 constructed in accordance with an embodiment of this disclosure to operate a vehicle 102. In the illustrated example, the vehicle 102 includes an infotainment unit 130, a collection of electronic control units (ECUs) 132, a position tracking system 134, a communication unit 136, external sensors 138A, internal environmental sensors 138B, and a vehicle controller (VC) 140. The infotainment unit 130, the collection of ECUs 132, the position tracking system 134, the communication unit 136, the external sensors 138A, the internal environmental sensors 138B, and the VC 140 are coupled together via a data bus 142. The data bus 142 of the example vehicle 102 provides pathways for multiple network protocol communications (e.g., control area network (CAN), local interconnect network (LIN), media oriented system transport (MOST), etc.). The data bus 142 can comprise one or more wired or wireless connections, or a combination thereof The example vehicle 102 of FIG. 1 is provided with the example infotainment unit 130 (e.g., a head unit) that includes components such as a dashboard display, a media center, a center console display, driver accessible buttons (e.g., climate controls, door lock controls), etc. The infotainment unit 130 may also include a data store or other memory to store or retrieve media (e.g., movies, music, television programs, podcasts, etc.), system firmware, navigation data, diagnostic information, data collected by data collection systems (e.g., cameras mounted externally on the vehicle 102, weather data collection, etc.), etc. The example infotainment unit 130 also functions as a human machine interface that provides options to the driver of the vehicle 102 and communicates the driver's selected options to the corresponding ECU 132 and/or the example VC 140. For example, infotainment unit 130 may present automatic transition options to the driver via a center console display and communicate the selected transition options to the example vehicle controller 134. It will be appreciated that the driver can also be presented with automatic transition options verbally via audio speakers and the driver can likewise verbally communicate the selected transition options to the example vehicle controller 134.

The example ECUs 132 of FIG. 1 are discrete computing devices. The example ECUs 132 contain a processor (e.g., a microcontroller) to process data and execute programmable instructions (e.g., assembly level instructions, functional sequential instructions, and/or object oriented instructions). In this application, a processor may encompass one or more processors. The example ECUs 132 also are provided with on-board memory (e.g., Static Random Access Memory (SRAM), Electrically Erasable Programmable Read Only Memory (EEPROM), and/or Flash memory) to store data received and/or generated by the ECU 132. In this application, memory may encompass one or more memory. The example ECUs 132 are further provided with Input and/or Output (I/O) ports such as supply voltage inputs, digital and/or analog inputs, relay drivers, H-bridge drivers, injector drivers, and/or logic outputs. These I/O ports are used by the ECU 132 to receive data from sensors and transmit signals to mechanical components (e.g., actuators) to affect the mechanical components operations based on the operating parameters of the vehicle. The received data and/or the transmitted signals are communicated from the ECU 132 via the data bus 142 or through a directly wired connection between the ECU 132 and the mechanical component. It will be appreciated that in some embodiments, the functionality of various ECUs 132 may be implemented as virtualized functions or software that supported by a common set of processor(s) and memory(s).

The example ECUs 132 of FIG. 1 control low level systems (e.g., door controls, headlight controls, engine controls, transmission controls, steering system, climate controls, seat controls, mirror controls, etc.) and/or high-level systems (e.g., radio systems, voice controls, entertainment systems, a position control system, etc.) connected to the data bus 142. Each ECU 132 monitors its corresponding system by reading sensor signals. These sensors are placed on the mechanical components of the system. These sensors are in addition to the external sensors 138A and internal environmental sensors 138B described in more detail below. The sensors report factors such as the operating parameters of the vehicle, also known as the vehicle configuration, and may include the type of media being presented (e.g., fast or slow tempo music, movie being presented, sports reports, weather reports, etc.), the environmental settings (e.g., air conditioner/heater on or off, windows open or closed), the status of the vehicle subsystems (e.g., headlights on or off, wipers on or off, traction control on or off, 4 wheel drive engaged or disengaged, etc.), performance parameters (e.g., engine RPMs, vehicle speed, fuel level, engine temperature, etc.) and the like, or a combination of the above. These factors contribute to if, when, and/or how the ECU 132 generates output signals to execute control over the corresponding system.

For example, the ECU 132 responsible for door control has sensors monitoring door lock buttons, position of doors (e.g., open or closed), door locks (e.g., engaged or disengaged), and/or child lock switches (e.g., engaged or disengaged). Based on the readings of these sensors, the door control ECU 132 may, for example, make a decision on whether or not to generate a lock engaging signal to the doors of the vehicle.

Each of the ECUs 132 may be of different size and/or complexity according to the system the individual ECU 132 is controlling. In the illustrated example, the ECUs 132 are in communication with other units of the vehicle via the data bus 142. In some examples, the ECUs 132 may send and/or receive information (e.g., the status of the systems or components of the vehicle, diagnostic information, telemetry data, etc.) to a remote device (e.g., a mobile device such as a smartphone, tablet, smartwatch, etc.) via the vehicle communication unit 136 and/or may receive information (e.g., commands, operating parameters, firmware/software updates, media files, etc.) from the remote device via the vehicle communication controller 136. For example, such information may be communicated between the ECUs 132 and the remote device using a Bluetooth, Wi-Fi, or near field communication (NFC) connection generated and/or managed by the example vehicle communication unit 136.

ECUs can be deployed in a one-to-one fashion. That is, each ECU is provided with processing power and system memory ample enough to control a corresponding single system of the vehicle. Each ECU will vary in size according to the complexity of the corresponding system. In some examples, however, the ECUs 132 in the example vehicle 102 may be more robust than a typical ECU and capable of controlling multiple systems (e.g., the ECM may control the engine and the transmission system). For example, a robust ECU may be provided with amounts of processing power greater than a typical ECU processor (e.g., more cores, faster clocking speeds, larger processing cache, etc.) and higher amounts of random access memory (RAM) and may control more than one system as is typical of the average ECU.

In the illustrated example of FIG. 1, the position tracking system 134 tracks or otherwise obtains the location, velocity and acceleration of the vehicle. The position tracking system 134 may use one or more systems that use internal signals/information, one or more systems that use external signals/information, or a combination system that uses internal and external signals to track the location, velocity and acceleration of the vehicle. Example systems that use external signals may include global positioning systems (GPS), cellular based positioning systems, other location-based position services, and the like. Example internal signals/information may include the size and rotation rate of the vehicle's wheels to determine the speed and acceleration of the vehicle, signals from a compass to determine the direction of the vehicle, signals from an inertial guidance system (including gyroscopes, accelerometers, an altimeter, and the like) to detect changes in direction and/or acceleration, signals from video cameras, laser range finders, radar or the like, to determine the vehicle location relative to objects around the vehicle, for example the edge of a road, nearby buildings and the like.

The position tracking system may also include predefined location information, for example, a map of the area where the vehicle is located. The map may include the locations of objects to within precise distances, for example within plus or minus a foot or meter. The maps may be downloaded from external sources or come preloaded in the vehicle, or a combination thereof. The maps may include "street views" that show the perspective view of objects around a location, although many other perspectives are possible include aerial views, satellite views, etc.

In the illustrated example of FIG. 1, the vehicle communication unit 136 of the illustrated example manages communications between the example vehicle 102 and network providers or entities (e.g., a car manufacturer, a telecommunication service provider, an internet service provider, a media provider, etc.) via a wired and/or wireless connection (e.g., 4G/5G/LTE, an IEEE 802.11 wireless connection, a Bluetooth connection, a cable/DSL/satellite modem, a cell tower, etc.). In some examples, the vehicle communication unit 136 may be implemented as an array of communication platforms (e.g., Bluetooth modem, NFC reader, RF communication array, 4G/5G/LTE/GSM modem, etc.). The vehicle communication unit 136 of the illustrated example maintains network information (e.g., a network address, network settings, etc.) required to send and/or receive data over the various communication platforms. The example vehicle communication unit 136 manages the connections between the vehicle and outside entities (e.g., a Bluetooth connection between a mobile device and the example ECU 134). In some examples, the vehicle communication unit 136 may establish communicative connections with different network entities (e.g., a car manufacturer, a telecommunication service provider, an internet service provider, a media provider, etc.) to send data from the vehicle 102 to the network entities and/or receive data from the network entities for delivery to the vehicle, for example a map of the surrounding area of the current vehicle location or over-the-air software or firmware updates. In addition, the vehicle communication unit 136 may communicate with a computing device, such as a personal electronic device (e.g., a smartphone, a tablet, a smart watch, etc.), a personal computer (e.g., a desktop, a laptop, etc.), a diagnostic computer (e.g., at a dealership, etc.), etc. In some examples, one or more computing devices connected to the vehicle 102 via the vehicle communication unit 136 may transmit and receive information, such as vehicle diagnostic data, media files (e.g., movies, music, television programs, etc.) uploaded to a memory of the vehicle 102, firmware and/or software updates, etc.

The example external sensors 138A of the illustrated example detect the conditions around the vehicle. In some examples the external sensors 138A can provide up to a full 360 degree coverage or view around the vehicle. In some examples there are multiple external sensors placed at different locations around the vehicle. For example, the external sensors 138A may be located at the front, rear and sides of the vehicle and/or on the roof/top/undercarriage of the vehicle. The example external sensors can provide up to a 360 degree coverage or view around the vehicle, as desired or required for a particular application. The external sensors 138A determine the conditions outside the vehicle (e.g., temperature, the surface road condition (dry, wet, snow covered, icy, etc.), the weather conditions (e.g., dry, raining, snowing, foggy, humidity etc.), the number and proximity of objects (e.g., light traffic, heavy traffic, narrow road, wide road/open space, pedestrians present, etc.), the velocity of objects nearby the vehicle (e.g., stationary, slow or fast, moving away from or toward the vehicle), the presence or absence of certain items or objects (e.g., road or driveway markings, external tags, sensors, etc.) and the like, or a combination of the above.

The external sensors 138A may include video cameras, laser range finders, infrared sensors, radar sensors, moisture sensors, ultrasonic sensors, RFID sensors, microphones, thermometers, proximity sensors and the like. The external sensors may also be used by the position tracking system to determine a more accurate location of the vehicle than provided by external signals alone. For example, the external sensors may be used to determine in which lane of a road the vehicle is traveling by detecting lane markers, the edges of the pavement, the border between the road and sidewalks, the border between the road and a centerline divider, or the like.

The example internal environmental sensors 138B of the illustrated example detect the conditions inside the vehicle. In one example, the internal environmental sensors may be placed at multiple locations throughout the interior of the vehicle. In another example, the internal environmental sensors may be concentrated at one location. The internal environmental sensors report the environmental condition inside the vehicle (e.g., temperature, the number and/or the identity of occupants, the type of media being presented, the time of day and/or day of the week, and the like, or a combination of the above).

The example VC 140 of the illustrated example may be implemented by any device accompanying software that accepts, processes, and/or transmits data within a vehicular information network (e.g., data bus 142). The example VC 140 may contain one or more processors to process data and execute programmable instructions (e.g., assembly level instructions, functional sequential instructions, computer readable code, and/or object oriented instructions). The example VC 140 is provided with on-board memory (e.g., Static Random Access Memory (SRAM), Electrically Erasable Programmable Read Only Memory (EEPROM), and/or Flash memory) to store data received and/or generated by the VC 140. The example VC 140 is further provided with Input and/or Output (I/O) ports such as supply voltage inputs, digital and/or analog inputs, relay drivers, H-bridge drivers, injector drivers, and/or logic outputs. The example VC 140 is in communication with other components of the vehicle 102 such as, the ECUs 132, the vehicle communication unit 136, the position tracking system 134, and the infotainment unit 130 via the data bus 142. In the example FIG. 1, the VC 140 acts as the controller of all ECUs 132 in the vehicle 102. That is, in certain examples, the VC 140 can instruct and/or alter changes to the operating parameters of the example ECUs 132 of the example vehicle 102.

In the illustrated example of FIG. 1, the example VC 140 receives data from the position tracking system, the internal sensors 138B, the external sensors 138A, and the ECUs 132. Using the received data, the example VC 140 identifies a repetitive occurrence during a floating time window. The repetitive occurrence is based on a starting vehicle condition, an ending vehicle condition and a transition path between the starting condition and ending condition as describe in further detail below. In an alternative embodiment, a user may also identify a repetitive occurrence for the VC 140 (e.g, identify that a previously completed occurrence is to be repeated in the future). Once a repetitive occurrence has been identified, the example VC 140 determines when the example vehicle 102 is nearing or otherwise reaches a starting vehicle condition. When the vehicle reaches the starting vehicle condition, the example VC 140 provides a function to a user that, when activated (e.g., verbal selection, electronic or manual button selection, etc.), automatically transitions the example vehicle 102 to the ending vehicle condition along the transition path.

In the illustrated example of FIG. 1, the vehicle 102 includes an example body 144, example wheels 146, an example seat 148, an example steering system 150, an example transmission 152 and an example motor 154. In the illustrated example, the body 144 covers the exterior of the vehicle 102 to protect and/or contain the other parts of the vehicle 102. In the illustrated example FIG. 1, example ECU 132A controls braking systems, ECU 132B controls the steering system, and ECU 132C controls the transmission system.

In the illustrated example, the motor 154 may be implemented by a combustion engine, a DC electric motor, and/or an AC electric motor. The example motor 154 is communicatively coupled to an example ECU 132 (e.g., ECU 132M) and the example transmission 152. The example ECU 132 (e.g., ECU 132M) receives operating power from the batteries 156 to control components of the motor 154 (e.g., throttle valve, sparkplugs, pistons, fuel injectors, etc.). The example ECU 132M receives signals from a driver (e.g., via sensors in a pedal, etc.) or from the example VC 140 to determine corresponding control signals to communicate to the example motor 154 (e.g., manipulating throttle valve, firing spark plugs, altering fuel injection quantities, etc.). In the illustrated example, the motor 154 supplies torque to the transmission 152 to drive two or more wheels 146.

Figure 2:
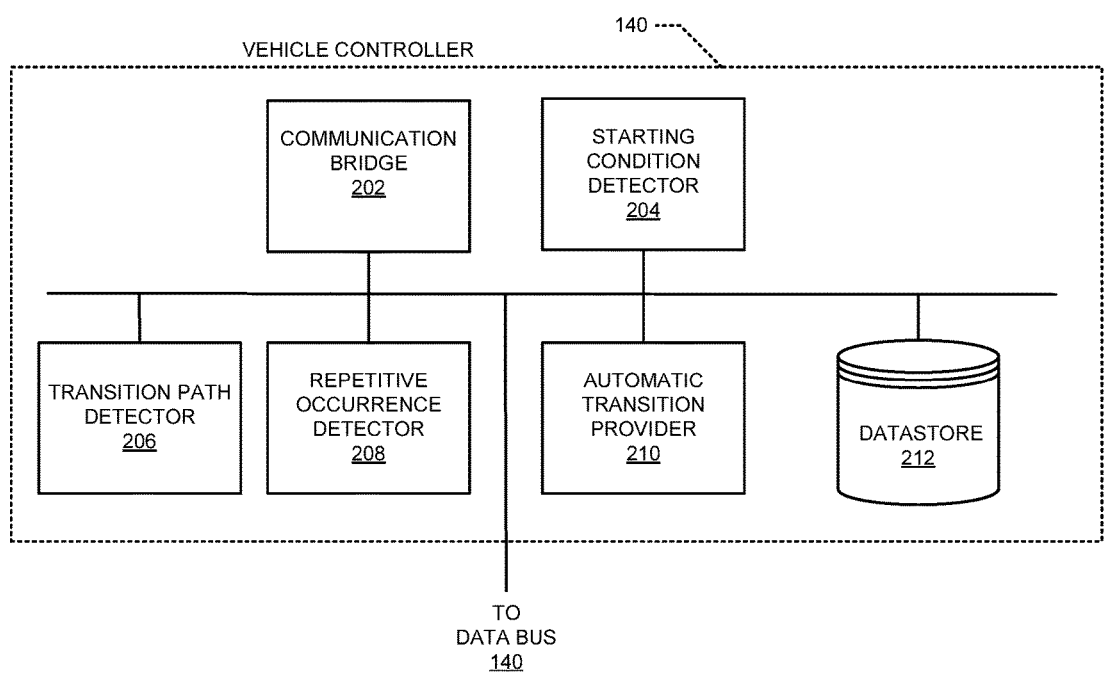
FIG. 2 is a block diagram of an example implementation of the example vehicle controller 140 of FIG. 1.

FIG. 2 is a block diagram of an example implementation of the example VC 140 of FIG. 1. In the example of FIG. 2, the VC 140 includes an example communication bridge 202, example starting condition detector 204, an transition path detector 206, an, an example repetitive occurrence detector 208, an example automatic transition provider 210, and an example datastore 212.

The example communication bridge 202 manages communication originating from or directed to the example VC 140. The example communication bridge 202 encodes and decodes messages between the VC 140 and the rest of the vehicle (e.g., the vehicle communication unit 136, the infotainment unit 130, the ECUs 132, etc.) via the data bus 142, etc. In some examples, the example VC 140 leverages the vehicle communication unit 136 to communicate with a remote device (e.g., a smartphone) and/or a remote server to establish an external data connection (e.g., Wi-Fi, LTE, Bluetooth, NFC, etc.). The example communication bridge 202 also marshals, arbitrates, and/or manages messages from the example VC 140 to send to corresponding ECUs 132 based on changes dictated by the automatic transition provider 210.

The example starting condition detector 204 obtains data from the position tracking system, the internal sensors 138B, the external sensors 138A, and the ECUs 132. The data may be obtained directly, or may be stored in datastore 212. Using the obtained data, the example starting condition detector 204 identifies starting vehicle conditions (also called starting conditions) that occur more than a threshold number of times during a floating time window. The starting conditions may be based on a vehicle location or position, a vehicle velocity or acceleration rate, the environmental conditions in or around the vehicle, the operating parameters of the vehicle, and the like, or a combination of the above starting conditions.

The starting condition may be classified into one or more categories based on the change in condition detected. For example if the vehicle has changed locations, a location or position category will be set. If a vehicle configuration has changed, the configuration category will be set. Another example starting position type may be based on the number of occupants in the vehicle. Categories may include, but are not limited to, a location or position category, a vehicle configuration category, an external environment category, an internal environment category, and the like. Some categories may include sub-categories, for example, the external environment category may include a road condition sub-category. Multiple categories may be set for a starting condition.

The floating time window may be a number of days, a number of weeks or a number of months, or another time period depending upon the type of repetitive occurrence. The floating time window may be preloaded, dynamically determined, or may be set by the operator of the example vehicle 102 using the infotainment unit 130. In some examples, the range for the user's settable floating time window may be restricted. For example, a user may only be able to set the floating time window between one day in length and less than 6 months in length. The floating time window may be different for different types of starting conditions. For example, a starting condition where the vehicle 102 is in park, and not moving, may have a different floating time window that a starting condition based on external conditions around the vehicle, for example when it is raining. In one example, the identified starting conditions that have occurred multiple times during the floating time window are stored in datastore 212.

The example transition path detector 206 obtains the starting positions identified by the starting condition detector 204. The example transition path detector 206 also obtains data from the position tracking system, the internal sensors 138B, the external sensors 138A, and the ECUs 132. The data may be obtained directly, or may be stored in datastore 212. Using the identified starting conditions and the obtained data, the example transition path detector 206 identifies transition paths that occur more than a threshold number of times during the floating time window, beginning from the identified starting conditions.

The example transition path detector 206 may only search for transition paths for identified starting condition that are classified as the same type of starting condition (e.g., in the same category), as described in further detail below. Transition paths may be based on a change or transition of conditions the vehicle follows from a common starting condition to a location where the condition diverges from other transition paths having the common/same starting condition. This location where transition paths diverge is known as the ending condition.

The transition path between the starting condition and ending condition may be based on a physical path the vehicle follows from a starting location to an ending location, a velocity/acceleration profile the vehicle follows between a starting location and an ending location, a velocity/acceleration profile the vehicle follows between a starting velocity and an ending velocity, a change in the vehicle configuration between a starting velocity and an ending velocity, a change in the vehicle configuration between a starting position and an ending position, a change in the vehicle configuration between a starting environmental condition and an ending environmental condition, and the like, or a combination of the above transition paths. In some examples, the example transition path detector 206 may store the identified transition paths for common starting conditions in datastore 212.

The example repetitive occurrence detector 208 obtains the identified transition paths for common starting conditions either directly from the example transition path detector 206 or from datastore 212. The example repetitive occurrence detector 208 may compare each set of identified transition paths having a common starting condition, to a number of criteria to determine when the set of identified transition paths qualify as a repetitive occurrence. In some examples, the criteria may include the number of times the identified transition path occurred during the floating time window, the time between the starting and ending condition, a distance between the starting and ending condition, the difference in velocity between the starting and ending condition, the number of changes in the vehicle configuration between the starting and ending condition, and the like. In some examples, the example repetitive occurrence detector 208 stores the identified repetitive occurrence in datastore 212.

Once a repetitive occurrence has been identified, the example automatic transition provider 210 determines when the example vehicle 102 is nearing a starting vehicle condition. When the vehicle reaches the starting vehicle condition, the example automatic transition provider 210 provides a function to an operator of the vehicle 102 that, when activated/engaged, automatically transitions the vehicle 102 to the ending vehicle condition along the transition path. In some examples, the automatic function is known as a transition option.

When the operator of the vehicle 102 engages/activates the function, the example automatic transition provider 210 generates and transmits instructions to the ECUs 132 of the example vehicle 102. The instructions generated and transmitted by the example automatic transition provider 210 cause the ECUs 132 to adjust the various operating parameters of the vehicle. Thus, by enacting the changes to the operating parameters of the vehicle, the vehicle 102 is transitioned from the starting condition to the ending condition, along the transition path.

In some examples, each of the ECUs 132 in the illustrated example FIG. 1 may not use the same instruction set. For example, one ECU may accept instructions in embedded C programming language while another only accepts instructions in a proprietary C variant language and/or C++. Yet other example ECUs may be FPGA's which only accept instructions in VHDL and/or Verilog.

The example automatic transition provider 210 determines which ECUs 132 are associated with the various operating parameters to properly transition the vehicle from the starting condition to the ending condition. To that end, the example automatic transition provider 210 is provided with a table listing ECUs, the ECU's instruction set language, and which operating parameters the ECU uses. For example, gear shift timing and engine air intake angle may be associated with the engine ECU, which communicates in embedded C and/or any other suitable language. Braking response may be associated with another ECU communicating in VHDL and/or any other suitable language. Thus, by utilizing this table the example automatic transition provider 210 may generate properly coded instructions to each ECU associated with each operating parameter such that the vehicle follows the transition path from the starting condition to the ending condition.

The example automatic transition provider 210 monitors data from the position tracking system, the internal sensors 138B, the external sensors 138A, and the ECUs 132. When internal conditions, external conditions and/or vehicle operating parameters deviate from the transition path, or prevent the vehicle from safely following the transition path, the example automatic transition provider 210 may return control to the operator of the vehicle or bring the vehicle to a safe stop. For example, when the vehicle 102 is following a transition path between a starting location and an ending location, and an object is detected in the path, the example automatic transition provider 210 may return control to the operator of the vehicle or bring the vehicle to a safe stop. Returning control to the operator may include warning the operator that the automatic function will be disengaged.

While an example manner of implementing the vehicle controller (VC) 140 of FIG. 1 is illustrated in FIG. 2, one or more of the elements, processes and/or devices illustrated in FIG. 2 may be combined, divided, re-arranged, omitted, eliminated and/or implemented in any other way. Further, the example communication bridge 202, the example starting condition detector 204, the example transition path detector 206, the example repetitive occurrence detector 208, the example automatic transition provider 210 and/or, more generally, the example VC 140 of FIG. 2 may be implemented by hardware, software, firmware and/or any combination of hardware, software and/or firmware. Thus, for example, any of the example communication bridge 202, the example starting condition detector 204, the example transition path detector 206, the example repetitive occurrence detector 208, the example automatic transition provider 210 and/or, more generally, the example VC 140 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication bridge 202, the example starting condition detector 204, the example transition path detector 206, the example repetitive occurrence detector 208, the example automatic transition provider 210 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example vehicle controller of FIG. 1 may include one or more elements, processes and/or devices in addition to, or instead of, those illustrated in FIG. 2, and/or may include more than one of any or all of the illustrated elements, processes and devices.

It will also be appreciated that in some embodiments, some of the elements, processes and/or devices in FIGS. 1 and 2 could alternatively be implemented in a network or a cloud-based environment. For example, vehicle controller 140 and the vehicle communication unit 136 could store and/or access data from a network or cloud-based location. Furthermore, some of the functionality such as the repetitive occurrence detector, the starting condition detector, and/or the transition path detector could be implemented in the network or cloud-based environment without departing from example embodiments. Many variations are possible.

Figure 3:
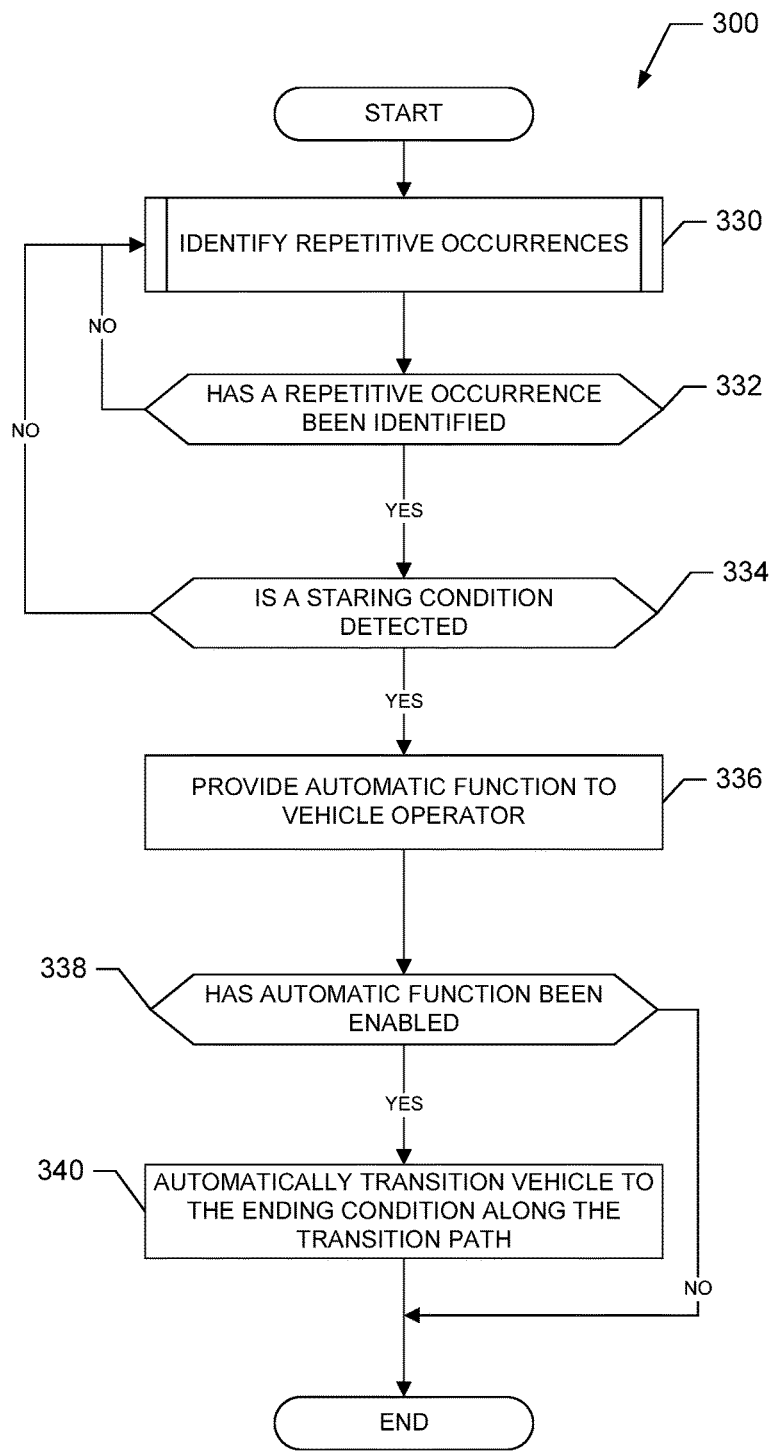
FIG. 3 is a flow diagram representative of example machine readable instructions that may be executed to implement the example vehicle controller of FIGS. 1 and/or 2 to operate a vehicle.

A flowchart representative of example machine readable instructions for implementing the vehicle controller 140 of FIG. 1 is shown in FIG. 3. In this example, the machine readable instructions comprise a program for execution by a processor such as the processor 712 shown in the example processor platform 700 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 4, many other methods of implementing the example apparatus 50 may alternatively be used. For example, the order of execution of the blocks may be changed, and/or some of the blocks described may be changed, eliminated, or combined.

As mentioned above, the example processes of FIGS. 3-5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3-5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is a flow diagram representative of example machine readable instructions that may be executed to implement the example vehicle controller 140 of FIGS. 1 and/or 2 to operate a vehicle. The program of FIG. 3 begins at block 300. The example vehicle controller 140 obtains data from the position tracking system 134, the internal and external sensors (138B and 138A) and the ECUs 132 and identifies repetitive occurrences during a floating time window (block 330). The repetitive occurrence is based on a starting vehicle condition, an ending vehicle condition and a transition path between the starting condition and ending condition, as described further below with respect to FIG. 4. Flow continues in block 332.

At block 332, the example vehicle controller 140 determines if a repetitive occurrence has been identified. If a repetitive occurrence is not identified, flow returns to block 330. When a repetitive occurrence is identified, flow continues in block 334. Once a repetitive occurrence has been identified, the example vehicle controller 140 determines if the example vehicle 102 is approaching the starting condition of a repetitive occurrence (block 334). If a starting condition is not detected, flow returns to block 330. When a starting condition occurs, flow continues in block 336.

Once a starting condition has been detected, the example vehicle controller 140 provides an automatic function to the vehicle operator using the infotainment unit 130 (block 336). Flow continues in block 338.

When the automatic function is not enabled (block 338), the process ends. When the automatic function is enabled (block 338), flow continues at block 340.

Once the automatic function is enabled, the example vehicle controller 140 automatically transitions the vehicle to the ending vehicle condition along the transition path (block 340).

Figure 4:
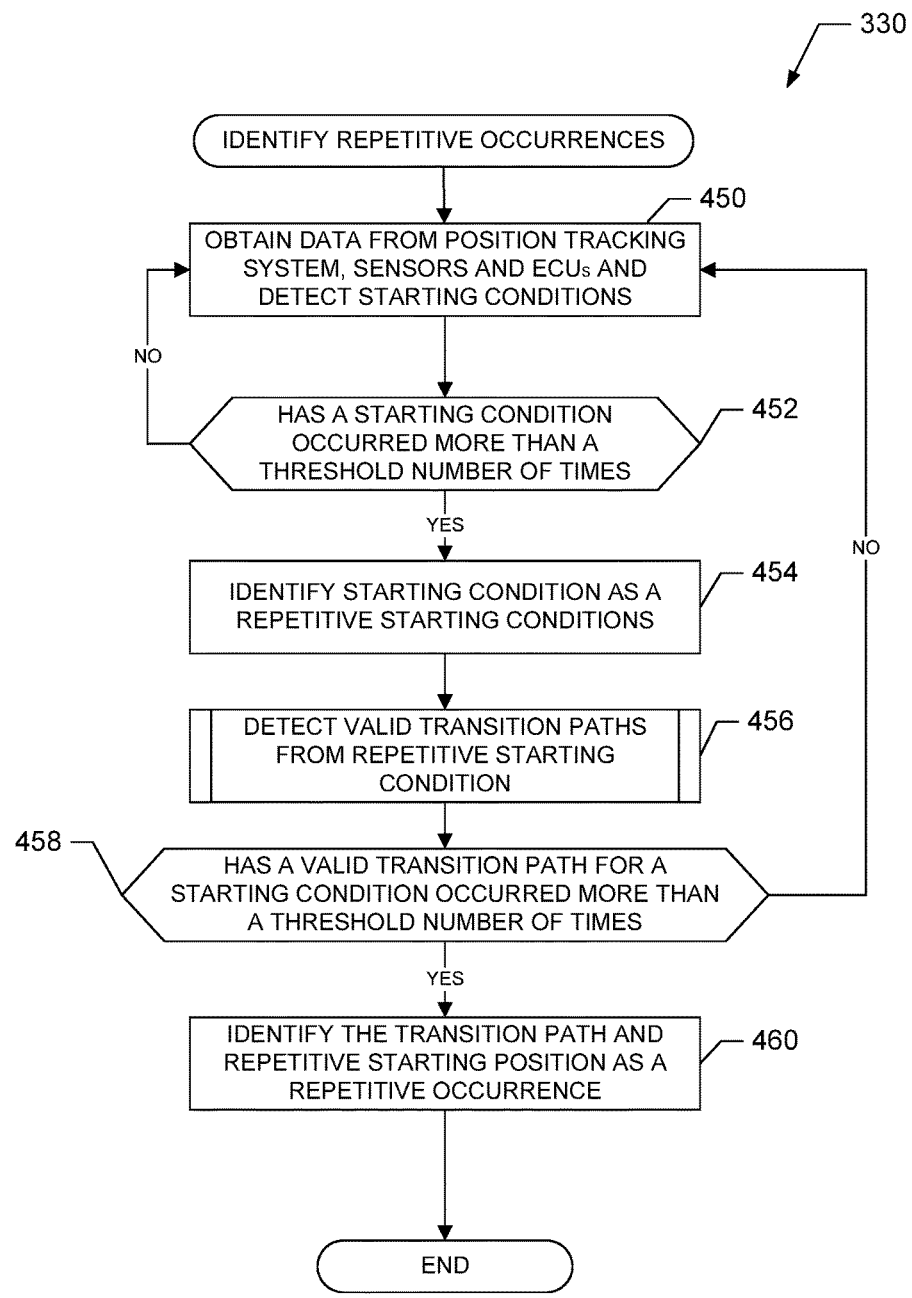
FIG. 4 is an example flow chart representative of machine readable instructions to identify repetitive occurrences.

FIG. 4 is a flow chart representative of machine readable instructions for identifies repetitive occurrences (block 330 of FIG. 3). The example starting condition detector 204 of FIG. 2 obtains data from the position tracking system 134, the internal and external sensors (138B and 138A) and the ECUs 132 and detects starting conditions within a floating time window (block 450).

A starting condition includes the vehicle position or location, the environmental conditions in and around the vehicle, the vehicle configuration, the time and date the starting condition occurred, and the like, or a combination of the above starting conditions.

The environmental conditions in the vehicle may include the temperature, the number and/or the identity of occupants, the type of media being presented, the time of day and/or day of the week, and the like, or a combination of the above.

The environmental conditions around the vehicle may include the temperature, the surface road condition (dry, wet, snow covered, icy, etc.), the weather conditions (dry, raining, snowing, foggy, etc.), the number and proximity of objects (light traffic, heavy traffic, pedestrians present, narrow road, wide road/open space, etc.), the velocity of objects nearby the vehicle (stationary, slow or fast, moving away from, or toward, the vehicle), and the like, or a combination of the above.

The vehicle configuration may include the speed and direction of travel, the location or position of the vehicle, type of media being presented (fast or slow tempo music, movie being presented, sports reports, weather reports, etc.), the environmental settings (air conditioner/heater on or off, windows open or closed), the vehicle subsystems operating (headlights on or off, wipers on or off, traction control on or off, 4 wheel drive engaged or disengaged, etc.), the operating parameters of the vehicle (engine speed, steering wheel position, accelerator position, etc.), and the like, or a combination of the above.

In some examples, the example starting condition detector 204 examines the current conditions of the vehicle to detect a starting condition based on a time interval. The time interval may be a fixed interval, for example every 10 seconds, or may be a variable time interval, where the interval is based on the speed of the vehicle. In some examples, the time interval can range between a tenth of a second and 10 minutes. In other examples, the time interval may be set to a smaller or larger amount.

When the example starting condition detector 204 is using a time interval and the time interval expires, the example starting condition detector 204 captures the current condition of the vehicle. The example starting condition detector 204 compares the current condition of the vehicle to the previously saved vehicle condition. If no change has occurred other than the passage of time, the example starting condition detector 204 resets the timer and discards the captured condition of the vehicle. When a change in condition occurred between the current condition of the vehicle and the previously saved vehicle condition, the current condition of the vehicle is saved as the current starting vehicle condition.

In other examples, the example starting condition detector 204 examines the current conditions of the vehicle to detect a starting condition based on a change event. A change event can be a change in the speed or location of the vehicle, a change in the vehicle configuration, a change in the external environment around the vehicle, a change in the internal environment inside the vehicle, and the like, or a combination of the above conditions. When a change in condition occurs, the current condition of the vehicle is saved as a starting condition.

The saved starting condition may be classified into one or more categories based on the change in condition detected. For example if the vehicle has changed locations, a location or position category will be set. If a vehicle configuration has changed, the configuration category will be set. Categories may include, but are not limited to, a location or position category, a vehicle configuration category, an external environment category, an internal environment category, and the like. Some categories may include sub-categories, for example, the external environment category may include a road condition sub-category. Multiple categories may be set for a starting condition. When a new starting condition has been saved by the example starting condition detector 204, flow continues in block 452.

Once a new starting condition has been saved by the example starting condition detector 204, the new starting condition is compared to previously saved starting conditions (block 452). In some examples, the new starting condition is only compared to previously saved starting conditions that have one or more of the same categories set. The example starting condition detector 204 determines how many of the previously saved starting conditions match the new starting condition. When a match is found the new starting condition may be associated with the matching starting condition.

When a previously saved starting condition is no longer within the floating time window, the previously save starting condition is discarded and not compared with the new starting condition. For example, if the floating time window is set at one month and a previously saved starting condition occurred more than one month ago, the previously save starting condition is discarded. In addition, when the previously save starting condition is discarded, any transition paths associated with that starting condition are also discarded and the association with any matching starting condition is removed.

For a match to occur between starting conditions, some vehicle conditions may be required to be identical between the new starting condition and the saved starting condition, for example lights on or off. For other vehicle conditions, the two parameters may only be required to be the same within some tolerance. For example the location of the vehicle may only be required to be the same between the two starting condition within plus or minus some distance (for example, one foot). When the number of matches satisfy (e.g., meets or exceeds) a threshold number of matches, flow continues at block 454. When the number of matches does not satisfy the threshold number, flow returns to block 450.

When the number of matches satisfy (e.g., meets or exceeds) the threshold number, the example starting condition detector 204 identifies (e.g. flags) the new starting condition as a repetitive starting condition (block 454). Flow continues in block 456.

The example transition path detector 206 obtains the repetitive starting condition and previously saved starting positions and identifies valid transition paths for the repetitive starting condition (as described in detail below with regards to FIG. 5) during the floating time window (block 456). When a valid transition path is identified, the valid transition path is associated with the repetitive starting position and saved. The valid transition path may also be classified into one or more categories based on the type of transition condition detected. In some examples, the categories for transition paths are the same as the categories for starting conditions. For example if the transition path is following a velocity profile, a velocity/acceleration category with be set.

The transition path between the starting condition and an ending condition may be based on a physical path the vehicle follows from a starting location to an ending location, a velocity/acceleration profile the vehicle follows between a starting location and an ending location, a velocity/acceleration profile the vehicle follows between a starting velocity and an ending velocity, a change in the vehicle configuration between a starting velocity and an ending velocity, a change in the vehicle configuration between a starting position and an ending position, a change in the vehicle configuration between a starting environmental condition and an ending environmental condition, and the like, or a combination of the above transition paths. Flow continues in block 458.

Once a new transition path (e.g. a valid transition path) has been saved by the example transition path detector 206 of FIG. 2, the new transition path is compared to previously saved transition paths (block 458). The new transition path is only compared to previously saved transition paths that have a common starting condition with the new transition path and at least one common transition path category. The example transition path detector 206 determines how many of the previously saved transition paths match the new transition path.

For a match to occur between transition paths, some vehicle conditions may be required to be identical between the new transition path and the saved transition path, for example lights on or off. For other vehicle conditions, the two parameters may only be required to be the same within some tolerance. For example the location of the vehicle may only be required to be the same between the two transition paths within plus or minus some distance (for example, one foot).

When the number of matching transition paths that match the new transition path satisfies (e.g., meets or exceeds) a threshold amount, flow continues at block 460. When the number of matching transition paths that match the new transition path does not satisfy the threshold amount, flow returns to block 450.

When the number of matching transition paths satisfy (e.g., meets or exceeds) the threshold number, the example repetitive occurrence detector 208 of FIG. 2 identifies (e.g. flags) the repetitive starting condition and the transition path as a repetitive occurrence (block 460).

Figure 5:
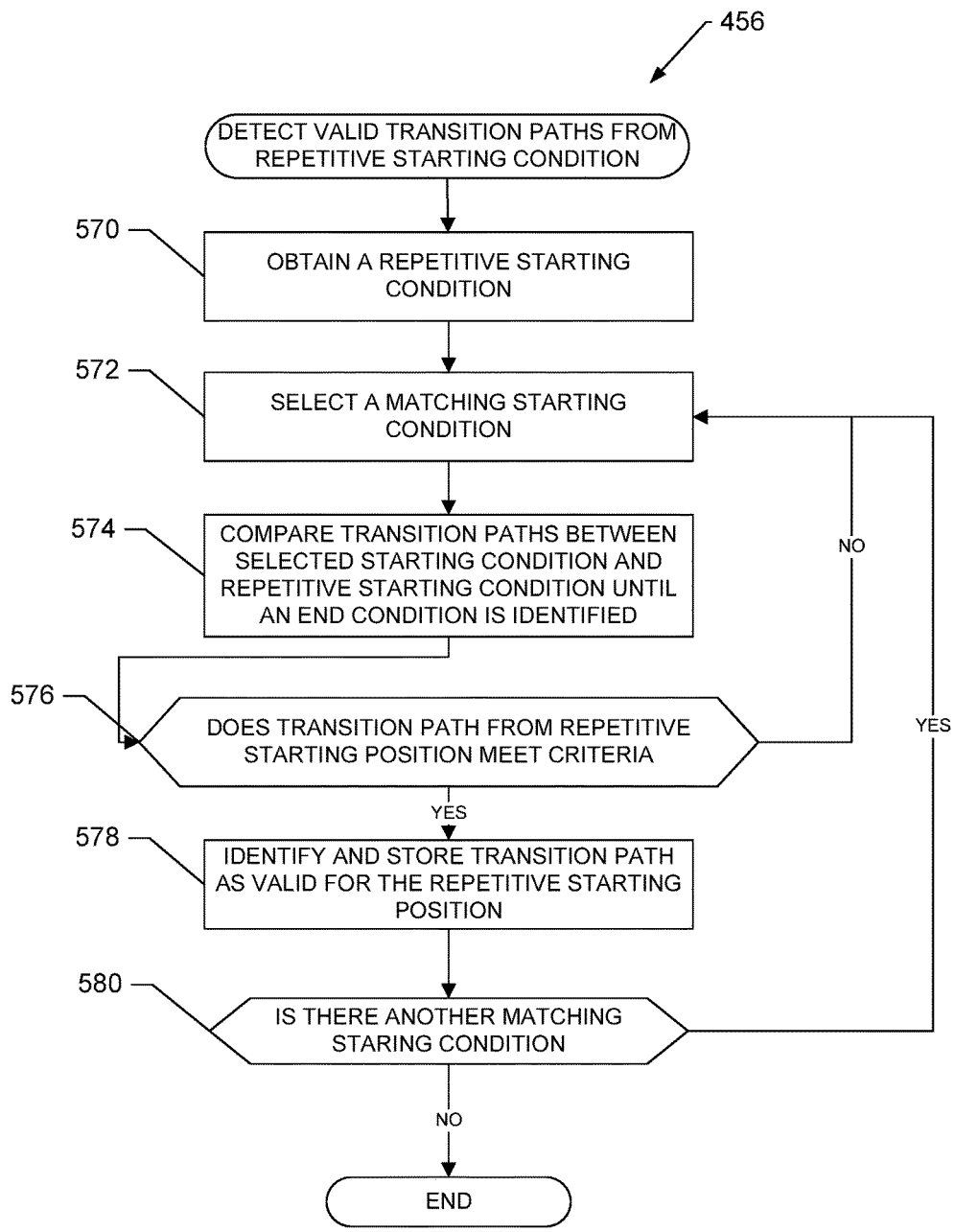
FIG. 5 is an example flow chart representative of machine readable instructions for detecting valid transition paths.

FIG. 5 is a flow chart representative of machine readable instructions for detecting valid transition paths (block 456 of FIG. 4). The example transition path detector 206 of FIG. 2 obtains a repetitive starting condition (block 570). The repetitive starting condition may be obtained from the example starting condition detector 204 of FIG. 2 or from the datastore 212 of FIG. 2. Flow continues in block 572.

The example transition path detector 206 of FIG. 2, selects a starting condition from datastore 212 that matches the repetitive starting condition (block 572). Flow continues in block 574.

The example transition path detector 206 of FIG. 2, examines a transition path between the selected starting condition and the repetitive starting condition for every common category between the two starting conditions. The two transition paths, one transition path starting from the selected starting condition and the other transition path starting from the repetitive starting condition, are followed for a category until the condition between the two paths diverge. The place/time where the conditions diverge is known as the ending position for the two paths. The common path between the two transition paths is between the common starting condition and the ending condition. Flow continues in block 576

The common path between the selected starting condition and the repetitive starting condition is compared to criteria to determine if the common path is a valid path. The criteria may be different for different categories of transition paths. For example, a transition path with a position or location category may have a minimum length. A transition path with an external environmental condition category may have a minimum condition change requirement, for example a minimum temperature different of at least 5 degrees. When the common path does not meet the criteria, flow returns to block 572. When the common path does meet the criteria, flow continues in block 578.

The example transition path detector 206 of FIG. 2 stores the common path as valid and associates the common path to the selected starting condition and the repetitive starting condition. Flow continues in block 580.

The example transition path detector 206 of FIG. 2 determines if there is another starting condition that matches the repetitive starting condition. When there is another matching starting condition flow returns to block 572. When all the matching starting conditions have been examined, flow continues in block 458 of FIG. 4.

Figure 6:
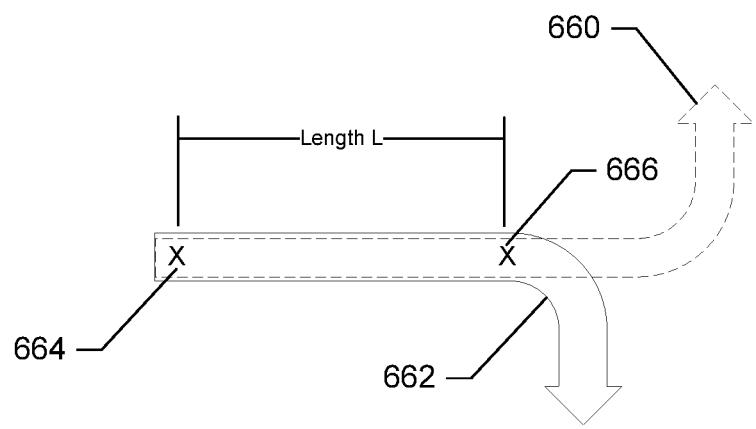
FIG. 6 is a diagram showing two example transition paths that have a matching/common starting condition.

FIG. 6 is a diagram showing two example transition paths that have a matching/common starting condition. The first transition path 660 is shown with dashed lines. The second transition path 662 is shown with solid lines. The two transition paths have a common starting condition 664. The example transition path detector 206 will follow the two transition paths from the common/matching starting condition 664 until the condition being followed no longer match. In the example of FIG. 6 the two transition paths diverge at 666. As such, point 666 is the ending position for the common transition path between transition path 660 and transition path 662. Length L is the length of commonality between transition path 660 and transition path 662. The length L may be measured as a distance, a length of time, a change in state of a vehicle configuration, a change in the environment inside or outside the vehicle, or the like, or a combination of the above.

In some examples, the transition paths of FIG. 6 may represent the physical path the example vehicle 102 followed at two different times. For example, transition path 660 may be the physical path the example vehicle 102 followed on one day, and transition path 662 may be the physical path the example vehicle 102 followed on another day. The physical path along length L is shown as a straight line in FIG. 6 for simplicity of illustration. The actual physical path along length L is not limited to a straight line, but can be any shape.

In some examples, the transition paths of FIG. 6 may represent the vehicle configuration the example vehicle 102 was in at two different times. For example, transition path 660 may be a combination of the external temperature, the speed of the vehicle and the position of the windows on one day, and transition path 662 may be a combination of the external temperature, the speed of the vehicle and the position of the windows on another day. The common starting condition may be that the temperature outside the vehicle is warm (for example above 75 degrees), the vehicle windows are open and the vehicle is traveling at a slow speed (for example below 30 MPH). The transition path may be that the vehicle is accelerating, and when the vehicle exceeds a given speed (for example 45 mph), the windows are closed.

In some examples, the transition paths of FIG. 6 may represent the speed profile the example vehicle 102 followed at two different times. For example, transition path 660 may be the speed profile the example vehicle 102 followed on one day, and transition path 662 may be the speed profile the example vehicle 102 followed on another day. For example, when the vehicle is approaching a toll booth, the common starting condition may be a given speed (for example the speed limit). The common starting condition may not require the vehicle to be in the same lane between the two transition paths, but may require the vehicles to be a common distance away from the toll booth. Once the vehicle is within a set distance to the toll booth, the vehicle decelerates along the same profile in both transition path 660 and transition path 662.

In some examples, the transition paths of FIG. 6 may represent a combination of the vehicle configuration and the position of the example vehicle 102 at two different times. For example, the common/matching starting condition may include having the vehicle parked in the same spot on two different days/times. The transition path may include putting the vehicle in reverse and backing the vehicle along the same path, stopping at the same position, putting the vehicle in a forward gear (for example drive), and starting the car in a forward direction. The starting condition may also include that the common starting spot is inside a structure, for example a garage. The common starting spot includes the condition that the vehicle is within a set distance from a front wall, and one or more side walls.

Figure 7:
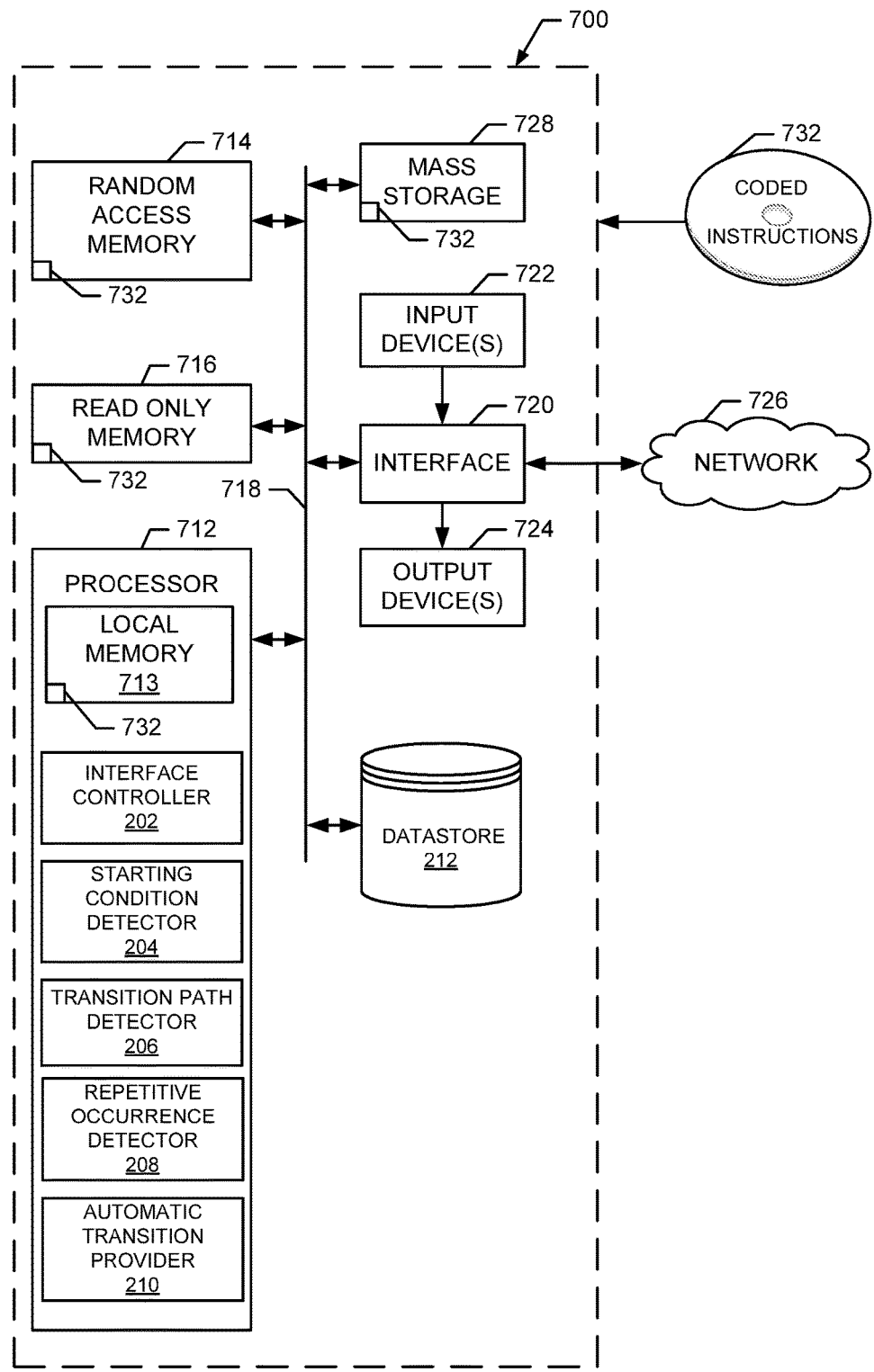
FIG. 7 is a block diagram of an example processor system structured to execute the example machine readable instructions represented by FIGS. 3-5 to implement the example vehicle controller unit of FIGS. 1 and/or 2.

FIG. 7 is a block diagram of an example processor platform 700 capable of executing the instructions of FIGS. 3-5 to implement the apparatus of FIGS. 1 and 2. The processor platform 700 can be, for example, a server, a personal computer, an embedded device, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device (s) 722 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 3-5 may be stored in the mass storage device 728, in the volatile memory 714, in the non-volatile memory 716, and/or on a removable tangible computer readable storage medium such as a CD or DVD.

From the foregoing, it will appreciate that the above disclosed methods, apparatus and articles of manufacture identify repetitive occurrences for a vehicle. The repetitive occurrence is based on a starting vehicle condition and a transition path between the starting condition and an ending condition. Once a repetitive occurrence has been identified, the example method includes detecting the occurrence of the starting vehicle condition. When the starting vehicle condition occurs, the vehicle provides a function to a user that, when activated, automatically transitions the vehicle to the ending vehicle condition along the transition path.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method of operating a vehicle, comprising:
tracking, by executing instructions with a processor, a location of the vehicle, a vehicle configuration and external conditions around the vehicle over a time period while an operator of the vehicle has enabled at least one function of the vehicle;

identifying, by executing instructions with the processor, a repetitive occurrence, the repetitive occurrence having a first start condition, a first end condition and a first transition path between the first start condition and the first end condition, wherein the first start condition, the first end condition and the first transition path match a previously-stored second start condition, a previously-stored second end condition and a previously-stored second transition path between the previously-stored second start condition and the previously-stored second end condition, respectively, and wherein the first start condition, the first end condition and the first transition path and the previously-stored second start condition, the previously-stored second end condition and the previously-stored second transition path occurred during the time period;

determining, by executing instructions with the processor, a number of times the repetitive occurrence occurs during the time period;

comparing, by executing instructions with the processor, the number of times the repetitive occurrence occurs to a first threshold; and when the first threshold is satisfied and the vehicle is located at the first start condition, providing an automatic transition provider, that when activated by the operator of the vehicle, will automatically transition the vehicle along the first transition path between the first start condition and the first end condition.

2. The method of claim 1, wherein identifying the repetitive occurrence includes:

detecting, by executing instructions with the processor, the first start condition during the time period;

determining, by executing instructions with the processor, a number of times the first start condition occurs during the time period;

comparing, by executing instructions with the processor, the number of times the first start condition occurs to a second threshold;

when the second threshold is satisfied:
identifying, by executing instructions with the processor, the first start
condition as a repetitive start condition;
detecting, by executing instructions with the processor, a valid transition path from the repetitive start condition, the valid transition path having the first end condition and meeting a criterion, the criterion including at least one of a minimum length, a minimum external environmental condition change, a minimum velocity change, a minimum acceleration change, or a minimum time;
when the valid transition path has occurred more than a third threshold number of times, identifying, by executing instructions with the processor, the valid transition path and the first start condition as the repetitive occurrence.

3. The method of claim 1, wherein the first transition path is based on a physical path the vehicle travels from a starting location to an ending location, or a velocity/acceleration profile the vehicle follows between the starting location and the ending location, or a velocity/acceleration profile the vehicle follows between a starting velocity and an ending velocity, or a change in vehicle configuration between the starting velocity and the ending velocity, or a change in vehicle configuration between a starting position and an ending position, or a change in vehicle configuration between a starting environmental condition and an ending environmental condition.

4. The method of claim 1, wherein the first start condition is classified into a category.

5. The method of claim 1, wherein the first transition path is a physical path the vehicle travels between a start position and an end position.

6. The method of claim 5, wherein a set of external conditions around the vehicle at the start position match, to within a threshold amount of, an average set of external conditions around the vehicle when the vehicle is at the start position.

7. The method of claim 5, wherein the first transition path corresponds to backing the vehicle out of a parking location.

8. A tangible computer readable storage medium, comprising instruction that, when executed by a processor, cause the processor at least to perform operations comprising:

tracking a location of a vehicle, a vehicle configuration and external conditions around the vehicle over a time period while an operator of the vehicle has enabled at least one function of the vehicle;

identifying a repetitive occurrence, the repetitive occurrence having a first start condition, a first end condition and a first transition path between the first start condition and the first end condition, wherein the first start condition, the first end condition and the first transition path match a previously-stored second start condition, a previously-stored second end condition and a previously-stored second transition path between the previously-stored second start condition and the previously-stored second end condition, respectively, and wherein the first start condition, the first end condition and the first transition path and the previously-stored second start condition, the previously-stored second end condition and the previously-stored second transition path occurred during the time period;

determining a number of times the repetitive occurrence occurs during the time period;

comparing the number of times the repetitive occurrence occurs to a first threshold; and when the first threshold is satisfied and the vehicle is located at the first start condition, provide an automatic transition provider, that when activated by the operator of the vehicle, will automatically transition the vehicle along the first transition path between the first start condition and the first end condition.

9. The tangible computer readable storage medium of claim 8, wherein the operations further comprise:

detecting the first start condition during the time period;

determining a number of times the first start condition occurs during the time period;

comparing the number of times the first start condition occurs to a second threshold;

when the second threshold is satisfied:
identifying the first start condition as a repetitive start condition;
detecting a valid transition path from the repetitive start condition, the valid transition path having the first end condition and meeting a criterion, the criterion including at least one of a minimum length, a minimum external environmental condition change, a minimum velocity change, a minimum acceleration change, or a minimum time;

when the valid transition path has occurred more than a third threshold number of times, identifying the valid transition path and the start condition as the repetitive occurrence.

10. The tangible computer readable storage medium of claim 8, wherein the first transition path is based on a physical path the vehicle travels from a starting location to an ending location, or a velocity/acceleration profile the vehicle follows between the starting location and the ending location, or a velocity/acceleration profile the vehicle follows between a starting velocity and an ending velocity, or a change in vehicle configuration between the starting velocity and the ending velocity, or a change in vehicle configuration between a starting position and an ending position, or a change in vehicle configuration between a starting environmental condition and an ending environmental condition.

11. The tangible computer readable storage medium of claim 8, wherein the first start condition is classified into a category.

12. The tangible computer readable storage medium of claim 8, wherein the first transition path is a physical path the vehicle travels between a start position and an end position.

13. The tangible computer readable storage medium of claim 12, wherein a set of external conditions around the vehicle at the start position match, to within a threshold amount of, an average set of external conditions around the vehicle when the vehicle is at the start position.

14. The tangible computer readable storage medium of claim 12, wherein the first transition path corresponds to backing the vehicle out of a parking location.

15. A vehicle, comprising:
a vehicle controller comprising a processor and a memory storing instructions that, when executed by the processor, cause the processor to perform operations comprising:
track a location of the vehicle, a vehicle configuration and external conditions around the vehicle over a time period while an operator of the vehicle has enabled at least one function of the vehicle;
identify a repetitive occurrence, the repetitive occurrence having a first start condition, a first end condition and a first transition path between the first start condition and the first end condition, wherein the first start condition, the first end condition and the first transition path match a previously-stored second start condition, a previously-stored second end condition and a previously-stored second transition path between the previously-stored second start condition and the previously-stored second end condition, respectively, and wherein the first start condition, the first end condition and the first transition path and the previously-stored second start condition, the previously-stored second end condition and the previously-stored second transition path occurred during the time period;
determine a number of times the repetitive occurrence occurs during the time period;
compare the number of times the repetitive occurrence occurs to a first threshold; and
provide an automatic transition provider when the first threshold is satisfied and the vehicle is located at the start condition, that when activated by the operator of the vehicle, will automatically transition the vehicle along the first transition path between the first start condition and the first end condition.

16. The vehicle of claim 15, including:
a starting condition detector to detect the first start condition during the time period;
the starting condition detector to determine a number of times the first start condition occurs during the time period;
the vehicle controller to compare the number of times the first start condition occurs to a second threshold;
the vehicle controller to identify the first start condition as a repetitive start condition when the second threshold is satisfied:
a transition path detector to detect a valid transition path from the repetitive start condition, the valid transition path having the first end condition and meeting a criterion, the criterion including at least one of a minimum length, a minimum external environmental condition change, a minimum velocity change, a minimum acceleration change, or a minimum time;
when the valid transition path has occurred more than a third threshold number of times, the vehicle controller to identify the valid transition path and the first start condition as the repetitive occurrence.

17. The vehicle of claim 15, wherein the first transition path is based on a physical path the vehicle travels from a starting location to an ending location, or a velocity/acceleration profile the vehicle follows between the starting location and the ending location, or a velocity/acceleration profile the vehicle follows between a starting velocity and an ending velocity, or a change in vehicle configuration between the starting velocity and the ending velocity, or a change in vehicle configuration between a starting position and an ending position, or a change in vehicle configuration between a starting environmental condition and an ending environmental condition.

18. The vehicle of claim 15, wherein the first start condition is classified into a category.

19. The vehicle of claim 15, wherein the first transition path is a physical path the vehicle travels between a start position and an end position.

20. The vehicle of claim 19, wherein a set of external conditions around the vehicle at the start position match, to within a threshold amount of, an average set of external conditions around the vehicle when the vehicle is at the start position.

* * * * *